2 Sheets—Sheet 1.

C. BRADA.
Rocking-Chairs.

No. 8,924. Reissued Oct. 7, 1879.

Witnesses.
Otto Stufeland.
William Miller

Inventor
Charles Brada.
by
Van Santvoord & Hauff
his attys.

N. PETERS, PHOTO-LITHOGRAPHER, WASHINGTON, D. C.

2 Sheets—Sheet 2.

C. BRADA.
Rocking-Chairs.

No. 8,924. Reissued Oct. 7, 1879.

Witnesses.
Otto Stupland
William Miller

Inventor.
Charles Brada
by
Van Santwood & Hauff
his attorneys.

N. PETERS PHOTO-LITHOGRAPHER, WASHINGTON, D. C.

UNITED STATES PATENT OFFICE.

CHARLES BRADA, OF NEW YORK, N. Y.

IMPROVEMENT IN ROCKING-CHAIRS.

Specification forming part of Letters Patent No. 156,127, dated October 20, 1874; Reissue No. 8,924, dated October 7, 1879; application filed May 14, 1879.

*To all whom it may concern:*

Be it known that I, CHARLES BRADA, of the city, county, and State of New York, have invented a new and useful Improvement in Rocking-Chairs, which improvement is fully set forth in the following specification, reference being had to the accompanying drawings, in which—

Figure 1:
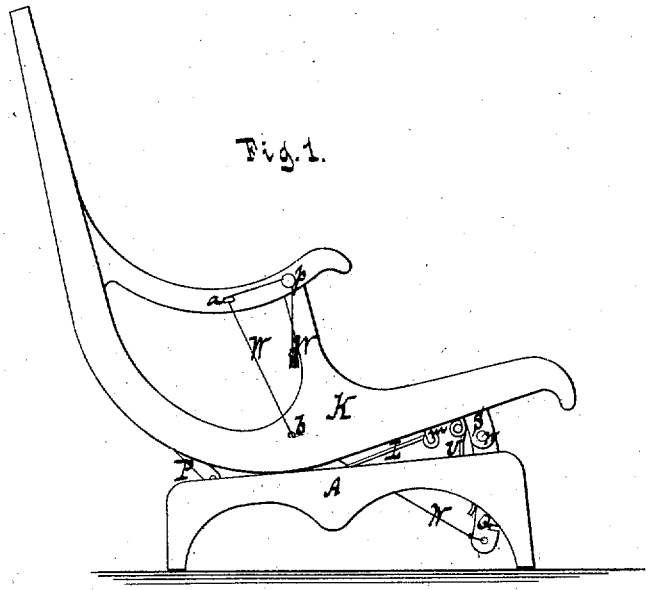
Figure 2:
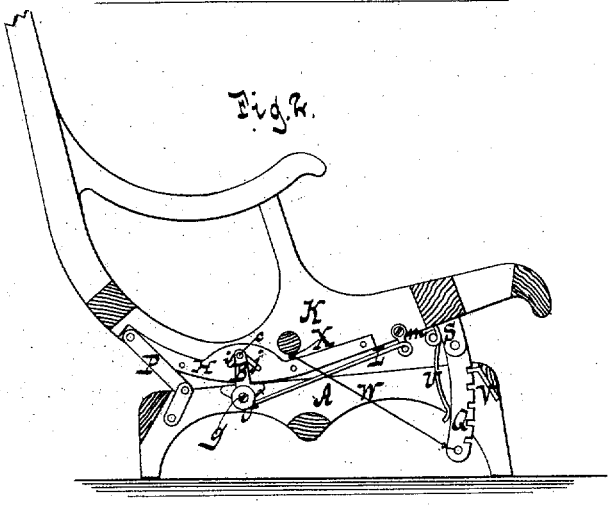
Figure 5:
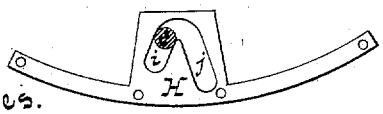
Figure 4:
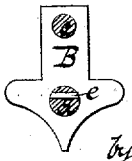
Figure 3:
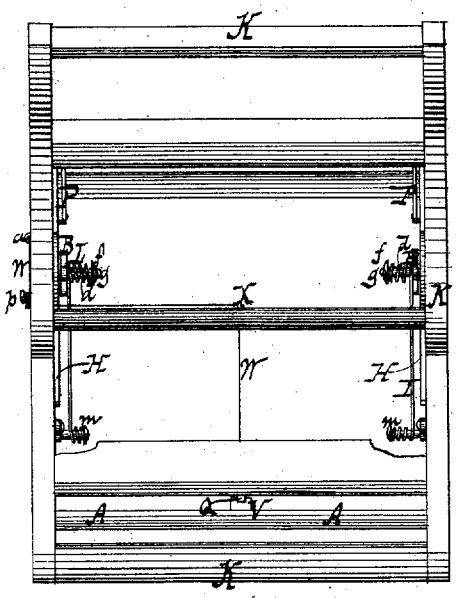

Figure 1 represents a side view of a chair constructed according to my invention. Fig. 2 is a vertical central section thereof. Fig. 3 is a plan or top view of the same. Figs. 4 and 5 are detail views of parts.

Similar letters indicate corresponding parts.

My invention relates to that class of chairs embodying a stationary or base frame to support the movable or rocking frame; and it consists in certain novel combinations of parts, hereinafter described, and pointed out in the claims, a preliminary description thereof being therefore deemed unnecessary.

In the drawings, the letter A designates a frame, composed of two side rails and suitable cross-pieces, which serves as a base or platform for supporting the rocking-chair—namely, the movable or rocking frame marked K.

To the inside of the respective rails of the base-frame A, I fasten a plate or standard, B, which constitutes a support for a pin or stop, *c*, the latter being fastened to the upper part or end of said plate.

To the inside of each rocker of the frame K, I fasten a plate, H, which is provided with a curved slot to form double bearings *i j* (see Fig. 5) for the pin *c*. One of the bearings *i j* serves to check the rocking frame K in its forward motion, and the other to check the same in its back motion, while both together serve to prevent said frame from being thrown out of the center in the act of working—that is to say, if the rocking frame K is tilted a sufficient distance in either direction the ends of the bearings *i j* strike against the pin *c*, while at the same time the rocking frame is guided in a certain fixed path by the contact of the bearings with said pin.

The plate H is fastened to such a part of the rocking frame K relatively to the pin *c* that when said frame is at rest the pin is in a lower part of the slot forming the bearings *i j*, and is held by the edges of the slot against moving in a horizontal plane. It follows that the rocking frame K is held against longitudinal displacement from the position to which it is guided by the action of the bearings *i j* and pin *c*, and no extraneous devices are required for this purpose. The bearings *i j* and pin *c* thus perform three functions—namely, to guide the rocking frame K, and to check the same in its motions, and to prevent longitudinal displacement thereof when it is at rest.

The slot forming the bearings *i j* is so shaped that these bearings have different lengths, as clearly shown in Fig. 5. The short bearing *i* is the one receiving the pin *c* in the forward motion of the rocking frame K, and the long bearing *j* the one receiving such pin in the back motion of the frame, and hence the forward motion of the frame is rendered shorter than the back motion. This is a desideratum, as, if the rocking frame were allowed the same motion in both directions, the occupant of the chair might through carelessness be thrown out in the forward motion—a danger which is overcome by shortening such motion.

To the lower part of each of the plates B, I fasten a horizontal pin or projection, *d*, for the attachment of one end of a spring, L, the said pin having a groove, *e*, cut in it (see Fig. 4) to receive one end of the spring, and being provided with a cap, *f*, and screw *g*, for holding the spring in position.

The springs L, one on each side of the chair, are coiled on the pins or projections *d*, at the ends where they are fastened thereto, as stated, and they are thence carried forward and fastened at their opposite or forward ends to the rocking frame K, so that the springs act on this frame with a tendency to give the same a forward motion when it is thrown back by the weight of the occupant.

For the purpose of fastening the springs L to the rocking frame K, I make use of connecting-links *m*. By means of these pivoted links, connecting the front ends of the springs L with the frame K, the latter is permitted to freely rock, while at the same time any longitudinal sliding motion of the rocking frame on the stationary frame is avoided. Elbow-jointed guides P, one on each side of the chair, which are fastened to the rocking frame K at one end, and to the base-frame A at the other end, serve to steady the rocking frame and prevent the breaking of the plate H when the chair is thrown violently forward.

In order to allow the rocking frame K to be made stationary at the will of the occupant a toothed bar or segment, Q, is hinged to the front part of the rocking frame, and a catch, V, is fastened to the base-frame A in a suitable position to engage such bar, an arm, S, being used for the purpose of hinging the bar, and the latter being subjected to the action of a spring, U, having a tendency to press the same forward, so that its teeth may receive and be held by the catch.

A cord or band, W, is attached to the lower part or end of the toothed bar Q, and is carried thence through an eye or guide, X, attached to the rocking frame, from which it passes through a hole, *b*, in the side of this frame, up through another eye, *a*, affixed to one of the chair-arms. This cord W serves to draw back the toothed bar Q, and thereby to free the rocking frame, so that it may work upon the base-frame.

When the toothed bar Q is drawn back by means of the cord W, the latter is intended to be fastened to a button, *p*, so that the bar is held in a retracted position or away from its catch. If the cord W is then again loosened, the toothed bar Q follows the action of the spring U and engages with its catch, thereby holding the rocking frame stationary.

What I claim as new, and desire to secure by Letters Patent, is—

1. In a rocking-chair, the combination, with a base or supporting frame and a rocking frame supported thereon, of a pin and a center-plate having double bearings *i j* for the pin, and arranged substantially as described, whereby the pin is made to engage one of said bearings when the chair is at rest, and prevents a longitudinal sliding motion of the rockers, as set forth.

2. In a rocking-chair, the combination, with a rocking frame and a base or supporting frame, of a pin and a center-plate having double bearings of unequaled lengths for the pin, and arranged substantially as described, to check the rocking frame, and cause a shorter forward motion, and at the same time act as stops to prevent longitudinal displacement of the rocking frame, as set forth.

3. The combination, with a rocking frame and a base or supporting frame on which it rests, of the standards B, attached to the base of the frame, and provided with the laterally-projecting pins *d*, and the springs L, coiled on said pins, and a link, *m*, connecting its other end with the rocking frame, substantially as described.

In testimony that I claim the foregoing I have hereunto set my hand and seal this 8th day of May, 1879.

CHARLES BRADA. [L. S.]

Witnesses:
W. HAUFF,
CHAS. WAHLERS.